United States Patent [19]
Melchior

[11] 3,894,392
[45] July 15, 1975

[54] SUPERCHARGED DIESEL ENGINES AND METHODS OF STARTING THEM

[75] Inventor: Jean Frederic Melchior, Fontenay-aux-Roses, France

[73] Assignee: Etat Francais, Paris, France

[22] Filed: Apr. 26, 1974

[21] Appl. No.: 464,391

Related U.S. Application Data

[63] Continuation of Ser. No. 263,759, June 19, 1972, abandoned.

[30] Foreign Application Priority Data
July 19, 1971 France .............. 71.26283

[52] U.S. Cl. ............. 60/599; 60/39.14; 60/611; 123/119 CD
[51] Int. Cl. ............................. F02b 37/04
[58] Field of Search ...... 60/599, 611, 39.14, 39.29; 123/119 CD

[56] References Cited
UNITED STATES PATENTS

| | | |
|---|---|---|
| 2,468,157 | 4/1949 | Barlas et al. ............. 123/119 CD |
| 2,503,410 | 4/1950 | Pouit ............................ 60/598 |
| 2,620,621 | 12/1952 | Nettel ........................... 60/599 |
| 2,645,409 | 7/1953 | Lawler ..................... 123/119 CD |
| 3,712,282 | 1/1973 | Isley ....................... 123/119 CD |

FOREIGN PATENTS OR APPLICATIONS
238,900   8/1945   Switzerland ............ 123/119 CD

*Primary Examiner*—Manuel A. Antonakas
*Attorney, Agent, or Firm*—Barnes, Kisselle, Raisch & Choate

[57] ABSTRACT

The diesel engine has a closed cooling system traversed by a liquid and a supercharging unit whose turbine is supplied by exhaust gases through a combustion chamber, and whose compressor supplies, on one hand, the engine through a cooler mounted in said cooling system, and, on the other hand, said combustion chamber. A by-pass pipe is arranged in parallel with the cooler, distributing means being provided at the beginning of this by-pass pipe, these distributing means being controlled so that, during the period of starting and rise in temperature of the engine, a part at least of the air delivered by the compressor passes through the by-pass pipe.

10 Claims, 3 Drawing Figures

SUPERCHARGED DIESEL ENGINES AND METHODS OF STARTING THEM

This is a continuation of application Ser. No. 263,759, filed June 19, 1972 and now abandoned.

The present invention relates to supercharged diesel engines and to methods of starting them. More particularly it relates to supercharged diesel engines with a low compression ratio.

As regards the methods of starting such engines, the expression "starting" denotes the starting proper and the raising of the temperature of such an engine.

These engines are cooled by a closed cooling system traversed by a cooling liquid such as water or a mixture of water and anti-gel.

These engines comprise a supercharging unit constituted by at least one turbine and at least one compressor. The turbine is supplied by exhaust gases from the engine through a combustion chamber ensuring the heating of the exhaust gases and the compressor supplies, on one hand, the engine through a cooler mounted in the cooling system of the engine, and, on the other hand, the heating combustion chamber.

Of course in these engines self-ignition at the end of the compression stroke is made possible by the prior starting of the supercharging unit whose compressor already delivers compressed and heated air. Now, during the starting of the engine and during its raising in temperature the cooler through which the compressor supplies the engine is at a low temperature since the cooling liquid has not yet reached its normal temperature. The cooler then lowers the temperature of the air admitted to a level no longer permitting self-ignition.

It will be understood therefore that recourse must be had to special means which are brought into action during the period of starting and of raising the temperature.

It is a particular oject of the invention to provide simple, efficient and reliable means for enabling easy starting and rapid raising of temperature of engines of the type concerned.

The engine according to the invention is characterised by the fact that a by-pass pipe is arranged in parallel with the cooler, distributing means being provided at the beginning of this by-pass pipe, these distributing means being controlled so that, during the period of starting and of raising the temperature of the engine, a portion at least of the air delivered by the compressor passes through the by-pass pipe.

The method, according to the invention, for starting and raising the temperature of such an engine, is characterised by the following steps:

the supercharging unit is started and this unit is brought to autonomous operating condition, the engine is started whilst acting on the distributing means enabling the admission into the engine of a portion at least of the air delivered by the compressor through a by-pass pipe arranged in parallel with the cooler, and this action is maintained on the distributing means until the temperature of the liquid of the cooling system reaches a value such that the air can be admitted into the engine through the cooler whilst preserving a sufficiently high temperature for self-ignition to occur at the end of the compression stroke.

The invention will in any case be better undertstood by means of the complement of description which follows as well as of the accompanying drawing, which complement and drawing relate to a preferred embodiment of the invention and are not to be taken of course as in any way limiting.

Figure 1:
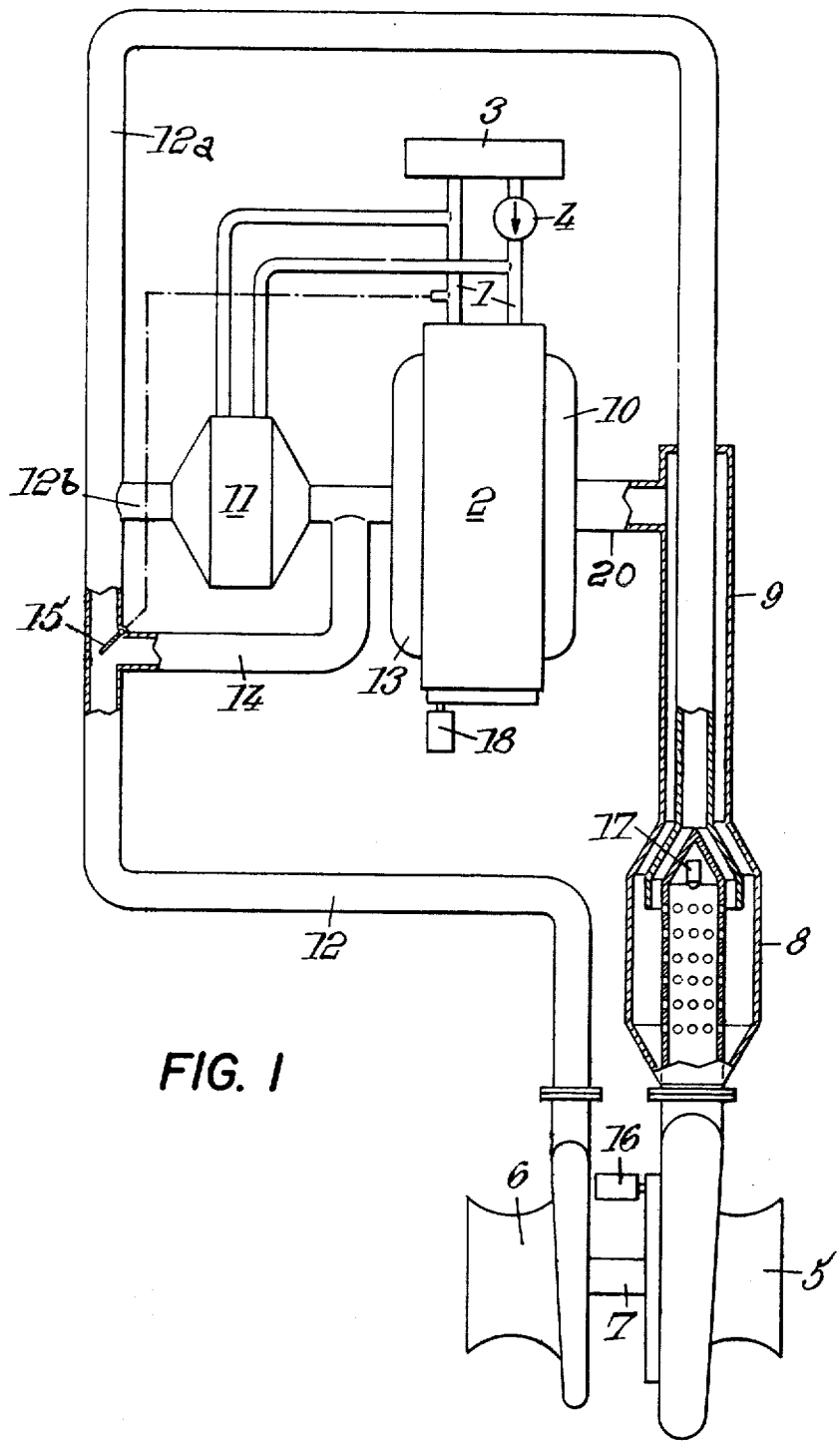
FIG. 1 is a diagrammatic view of one embodiment of an engine according to the invention.

The diesel engine represented in this Figure comprises a closed cooling system 1 traversed by a liquid (such as water or a mixture of water and anti-gel) circulating between the engine unit 2 and a radiator 3 by the action of a circulating pump 4.

This engine is supercharged by a supercharging unit constituted by a turbine 5 and a compressor 6 keyed on the same shaft 7.

The turbine 5 is supplied by exhaust gases through a combustion chamber 8; to this end, a pipe 9 connects this combustion chamber 8 to the exhaust manifold 10 of the engine.

The compressor 6 supplies, on one hand, the engine through a cooler 11, mounted, for example in parallel, on the cooling system 1, and, on the other hand, the combustion chamber 8. To this end, an air conduit means including pipe 12 and an engine bypass pipe 12a connects the compressor 6 with the combustion chamber 8 while a first branch conduit means in the form of a pipe 12b connects the compressor, via the conduit means, with the intake manifold 13 of the engine. An exhaust conduit 20 leads the exhaust gases from the engine to the combustion chamber 8.

This being the case and according to the invention, a second branch conduit means in the form of a by-pass pipe 14 is arranged in parallel with the cooler 11 in the pipe 12b and distributing means 15 are provided at the beginning of this by-pass pipe 14.

These distributing means 15 are controlled so that, during the period of starting and of rise in temperature of the engine, a portion at least of the air delivered by the compressor 6 passes through the by-pass pipe 14.

These distributing means 15 can be arranged so that a portion only of the air delivered by the compressor 6 passes through the by-pass pipe 14, in which case the remaining portion of the air supplies the combustion chamber 8 directly.

Figure 2A:
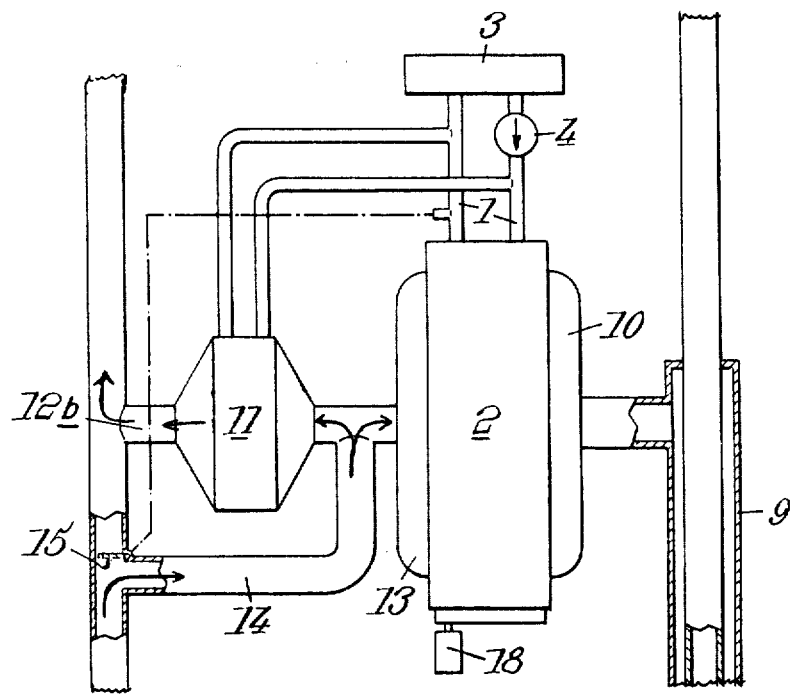
FIG. 2A is a portion of FIG. 1 illustrating this embodiment during the starting-up and rise in temperature mode of operation.

These distributing means 15 can also be arranged as shown in FIG. 2a so that the whole of the air delivered by the compressor 6 passes through the by-pass pipe 14, in which case the portion of this air which is not admitted into the engine supplies the combustion chamber 8 by traversing (in reverse direction) the cooler 11 in the branch 12b and then to the combustion chamber via pipe 12a, which causes more rapid heating of the liquid of the cooling system 1.

With view to rendering the operation of the distributing means 15 automatic, the control of these distributing means 15 can advantageously be servocoupled to the temperature of the liquid of the cooling system 1, so that, as long as this temperature remains below a normal value, the distributing means occupy a position such that a portion at least of the air delivered by the compressor 6 passes through the by-pass pipe 14, and, when this temperature becomes higher than the above-said normal value, the distributing means 15 occupy a position such that the inlet of the by-pass pipe 14 is closed.

Figure 2B:
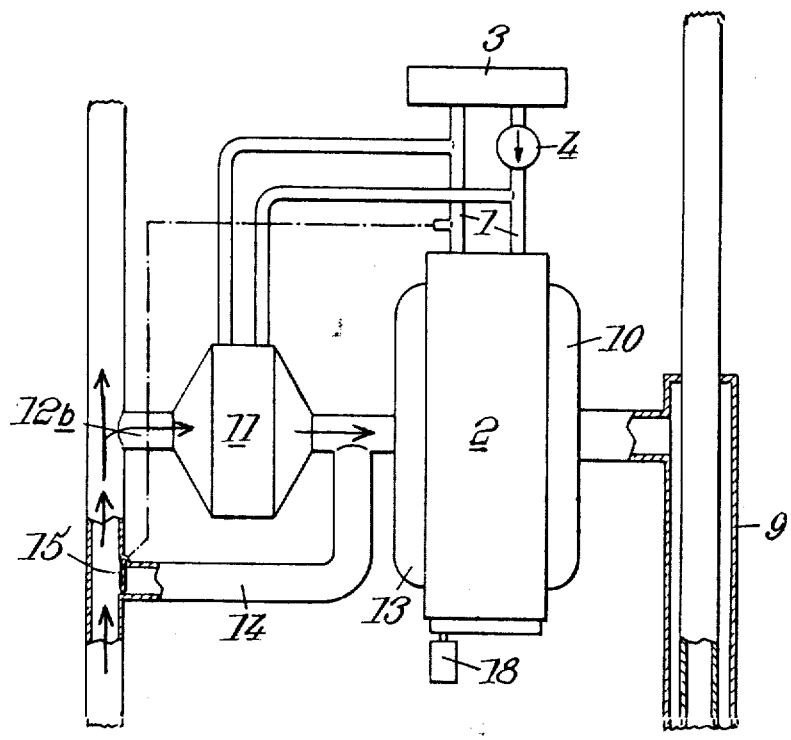
FIG. 2B is a similar portion of FIG. 1 illustrating this embodiment during normal operation of the engine.

The method of starting an engine constructed as has just been described is then as follows:

the starting of the supercharging unit is effected by means of a starter 16 and this unit is brought to autonomous operating condition by acting on the flow of fuel delivered by an injector 17 supplying the combustion chamber 8 with fuel, the starting of the engine is effected by means of a starter 18 whilst acting conjointly on the distributing means 15 (manually, or automatically if the control of these distributing means 15 is servocoupled to the temperature of the liquid of the cooling system 1), and this action is maintained on the distributing means 15 until the temperature of the liquid of the cooling system 1 reaches its normal value at which time the distribution means switches to normal operation as shown in FIG. 2B.

As a result of which and whatever the embodiment adopted, there is provided a diesel engine which can be easily put into operation and in which the rise in temperature is effected rapidly.

It will be understood that such an engine, mounted on a vehicle, enables this vehicle to be brought into service extremely rapidly.

Moreover, the improvements proposed by the invention are simple, inexpensive to produce, and of very reliable automatic operation.

I claim:

1. A supercharged diesel engine comprising a closed cooling circuit including a cooler traversed by a cooling fluid, a turbine, a compressor driven by the turbine, an external combustion chamber, exhaust conduit means leading the exhaust gases from the engine and from said external combustion chamber to said turbine, air conduit means leading air from said compressor to said turbine in bypass relation to the air intake of said engine, first branch conduit means traversing said cooler and leading air in a direction of normal temperature operation of the engine, which is from the said air conduit means through said cooler to the engine air intake, second branch conduit means connected at one end to said air conduit means upstream of the junction of said air conduit means and said first branch conduit means and at its other end connected with the engine air intake, and air distributing means for controlling the relative flow of air from the compressor on the one hand passing said junction and continuing through the air conduit means to said combustion chamber and on the other hand entering said second branch conduit means, said air distributing means including means for directing at least most of the air from said compressor to pass through said second branch conduit means and for directing a part of said air from said compressor which enters said second branch conduit means but is not directed into the engine to pass through the cooler in said first branch conduit means in reverse direction to the said direction of normal temperature operation of the engine and thence back into said air conduit means downstream of said distributing means during a period of starting up and rise in temperature of the engine thereby heating the cooling fluid and thus shortening said period.

2. A diesel engine according to claim 1 wherein said distributing means are arranged so that during said period of start-up a part only of the air delivered by said compressor passes through the second branch conduit means, the remaining part of the air delivered by said compressor supplying said combustion chamber directly via said air conduit means and bypassing the engine air intake and said cooler.

3. A diesel engine according to claim 1 wherein said distributing means are arranged so that the whole of the air delivered by said compressor passes through said second branch conduit means during said period of start-up, the part of this air which is not admitted into the engine supplying said combustion chamber by flowing through said cooler.

4. A diesel engine according to claim 1 in which the control of said distributing means is servocoupled to the temperature of the cooling fluid, so that, as long as this temperature remains below a normal reference value, said distributing means occupy a position such that the air delivered by said compressor passes through the second branch conduit means and, when this temperature becomes greater than said normal reference value, said distributing means occupy a position such that said second branch conduit means is effectively closed.

5. A method for starting and raising the temperature of a diesel engine equipped with a closed cooling system traversed by a cooling fluid and equipped with a supercharging unit comprising a turbine supplied by exhaust gases from an external combustion chamber and a compressor which supplies the engine with compressed air in a normal flow direction through a cooler mounted in said cooling system and which also supplies air to said combustion chamber, said method comprising the following sequence of steps:

1. starting the supercharging unit and bringing it to autonomous operating condition;
2. starting the engine while directing at least most of the air from the compressor into a bypass pipe which bypasses the cooler and leads to the engine air intake, admitting part of this bypassed air into the engine and directing the other part of the said bypassed air through the cooler in a direction reverse to said normal flow direction to heat the cooling fluid, and then directing said other part of the air directly to the combustion chamber;
3. and then causing a flow of air to the engine through said cooler in said normal flow direction while maintaining said flow of air from the compressor when the temperature of the cooling fluid of the cooling system reaches a value such that such flow of air can be admitted into the engine through the cooler in said normal flow direction while preserving a sufficiently high temperature for self-ignition to occur at the end of the compression stroke in the one or more cylinders of said engine.

6. A method for starting and raising the temperature of a diesel engine equipped with a closed cooling system traversed by a cooling fluid and equipped with a supercharging unit comprising a turbine supplied by exhaust gases from an external combustion chamber and compressor which supplies the engine with compressed air through a cooler connected to be traversed by the fluid in said cooling system and which also supplies air to said combustion chamber in bypass relation to the engine air intake, said method comprising the following sequence of steps:

1. starting the supercharging unit and bringing it to autonomous operating condition;

2. starting the engine while directing at least part of the air from the compressor into a bypass pipe which bypasses the cooler and leads to the engine air intake;
3. admitting this bypassed air into the engine and directing the other part of said bypassed air through the cooler to the combustion chamber in bypass relation to the engine air intake;
4. then increasing the flow of air to the engine via said cooler while maintaining said flow of air from the compressor when the engine reaches a warmed-up condition wherein the temperature of the cooling fluid of the cooling system reaches a value such that such flow of air from the compressor through the cooler to the engine can be admitted into the engine while preserving a sufficiently high temperature for self-ignition to occur at the end of the compression stroke in the one or more cylinders of said engine; and
5. maintaining an open air flow path between said compressor and said turbine communicating with said cooler and in bypass relation to the engine air intake for conducting the air not admitted to said engine to said turbine during said start-up condition.

7. A supercharged diesel engine assembly comprising a diesel engine having an internal combustion chamber, a closed cooling circuit for said engine combustion chamber traversed by a cooling fluid, an air cooler in said circuit also traversed by the cooling fluid therein, a turbine, a compressor driven by said turbine, an external combustion chamber, exhaust conduit means for conducting the exhaust gases from said combustion chambers to said turbine, air conduit means for conducting air from said compressor to said turbine in bypass relation to said engine internal combustion chamber, first branch conduit means for conducting air from the said air conduit means to the said engine internal combustion chamber via said air cooler, second branch conduit means connected between said air conduit means and said engine internal combustion air intake in bypass relation to said cooler, and air distributing means for controlling the air flow through said first branch conduit means relative to the air flow through said second branch conduit means, said air distributing means including means for directing at least part of the air from the compressor to pass through the second branch conduit means toward the engine during a period of starting up and rise in temperature of the cooling fluid and for directing said air from the compressor which is not admitted into said internal combustion chamber to pass through said cooler in the first branch conduit means and thence onward to said turbine such that the cooling fluid is heated while traversing said cooler to thereby shorten said period of starting up and such that during said period of starting up an open flow path is provided for air to flow between said compressor and turbine via said cooler and in bypass relation to said internal combustion chamber.

8. A diesel engine according to claim 7 wherein said distributing means are arranged so that during said period of start-up a part only of the air delivered by said compressor passes through the second branch conduit means, the remaining part of the air delivered by said compressor supplying said combustion chamber directly via said air conduit means and bypassing the engine air intake and said cooler.

9. A diesel engine according to claim 7 wherein said distributing means are arranged so that the whole of the air delivered by said compressor passes through said second branch conduit means during said period of start-up, the part of this air which is not admitted into the engine supplying said combustion chamber by flowing through said cooler.

10. A diesel engine according to claim 7 in which the control of said distributing means is servocoupled to the temperature of the cooling fluid, so that, as long as this temperature remains below a normal reference value, said distributing means occupy a position such that the air delivered by said compressor passes through the second branch conduit means and, when this temperature becomes greater than said normal reference value, said distributing means occupy a position such that said second branch conduit means is effectively closed.

* * * * *